United States Patent
McCollom et al.

(10) Patent No.: US 10,578,511 B2
(45) Date of Patent: Mar. 3, 2020

(54) FLEXIBLE UNIVERSAL BLADDER TOOL FOR DETECTING LEAKS IN A CLOSED FLUID SYSTEM

(71) Applicants: Gregory M McCollom, Anaheim, CA (US); Jim E Saffie, San Juan Capistrano, CA (US)

(72) Inventors: Gregory M McCollom, Anaheim, CA (US); Jim E Saffie, San Juan Capistrano, CA (US)

(73) Assignee: CPS Products, Inc., Miramar, FL (US)

( * ) Notice: Subject to any disclaimer, the term of this patent is extended or adjusted under 35 U.S.C. 154(b) by 442 days.

(21) Appl. No.: 15/268,411

(22) Filed: Sep. 16, 2016

(65) Prior Publication Data
US 2018/0080848 A1 Mar. 22, 2018

(51) Int. Cl.
*G01M 3/20* (2006.01)
*G01M 3/02* (2006.01)

(52) U.S. Cl.
CPC ............. *G01M 3/20* (2013.01); *G01M 3/022* (2013.01)

(58) Field of Classification Search
CPC ................................ G01M 3/20; G01M 3/022
USPC ....................................................... 73/40.7
See application file for complete search history.

(56) References Cited

U.S. PATENT DOCUMENTS

| | | | | |
|---|---|---|---|---|
| 5,431,184 A * | 7/1995 | Hazelton | ................. | F16K 35/10 137/383 |
| 2014/0083168 A1* | 3/2014 | Parker | .................... | G01M 3/20 73/40.7 |

FOREIGN PATENT DOCUMENTS

DE 19545383 A1 * 6/1996 ............ G01M 3/005

* cited by examiner

*Primary Examiner* — Tarun Sinha
(74) *Attorney, Agent, or Firm* — Morland C. Fischer (57) ABSTRACT

A flexible universal bladder tool is disclosed to be coupled between a source of "smoke" and a fluid system to be tested for leaks, such as that found in the automotive industry. The bladder tool is an inflatable bladder that surrounds a flexible smoke delivery tube which communicates with the source of smoke and a fluid duct of the system under test. By virtue of the flexible nature of the smoke delivery tube, the inflatable bladder is adapted to be bent around any of a variety of curved fluid ducts. The flexible smoke delivery tube is detachable from the tool so that the tube can be quickly replaced with a different tube having a different length. The inflatable bladder is filled with fluid (e.g., air) to expand into sealing engagement with the fluid duct, and the system under test is pressurized with smoke supplied thereto by way of the flexible smoke deliver tube.

10 Claims, 6 Drawing Sheets

FLEXIBLE UNIVERSAL BLADDER TOOL FOR DETECTING LEAKS IN A CLOSED FLUID SYSTEM

BACKGROUND OF THE INVENTION

1. Field of the Invention

This invention relates to a flexible universal bladder tool to be interconnected between a generator of "smoke" and a closed fluid system to be tested for leaks, such as, that found in the automotive industry. The bladder tool, which includes a flexible smoke delivery tube that is surrounded by an inflatable bladder, is advantageously adapted to bend around and expand into sealing engagement against any of a majority of curved air intake ducts leading to the system under test.

2. Background Art

A fuel tank, the engine manifold, and the intake and exhaust lines associated with a motor vehicle are known to experience cracks, boles and fissures for a variety of reasons. By way of a first example, a rock or another object encountered along a roadway may strike the undercarriage while the vehicle is in motion. By way of another example, normal wear and tea and/or the caustic effects of fuel may, over time, cause these vehicle components to degrade. In either case, because the damage caused is typically very small, such damage is often difficult to detect and locate to enable, repairs to be made. The result in not being able to accurately locate and repair the damage is that fuel fluid and/or vapor may leak, whereby the environment is exposed to toxic fumes.

Similar damage in a normally sealed intake, or induction system, of a naturally-aspirated internal combustion engine can result in an air leak. An air leak introduces extra air into the engine while in operation, since the engine creates vacuum. This extra air will usually cause an, engine's computer management system to introduce additional fuel to compensate for the added air, resulting in unnecessary fuel consumption. The same air leak in an older vehicle lacking an engine management system can result in an engine misfire, since the engine would be running lean, resulting in lack of engine performance and leading to engine damage. In a non-naturally-aspirated engine (e.g. turbocharged or supercharged engine), pressure is created instead of vacuum. A leak in the system could create sufficient pressure loss resulting in loss of engine power.

In order to test a closed fluid system for leaks, machines are known which generate a visible gas or vapor that is sometimes known in the automotive trade as "smoke." Smoke is supplied by the smoke machine to fill and pressurize the system to be tested, while the engine is turned off. A technician can then visually inspect the system by watching for any smoke which escapes therefrom to provide an indication of the presence and location of a leak. Because of the different types and sizes of fluid systems (of a motor vehicle) to be encountered and tested for leaks, an adapter is sometimes desirable by which the smoke machine can be coupled to any of a variety of correspondingly sized air ducts that lead to the system to be tested. One such adapter is an inflatable, balloon-type catheter apparatus disclosed in Publication No. US2014/0083168 published Mar. 17, 2014. The apparatus disclosed is configured to be inserted into and sealed against a canal of a system to be tested for leaks. An inflatable bladder is filled and expanded to create a seal against the canal of the system under test. A pressurized smoke is then passed through the apparatus to test for leaks.

However, many intake and exhaust ducts and duct sections of a motor vehicle are either short in length or curved. In this same regard, an air-tight seal would need to be created between the adapter and the air duct which is not straight but has a sharp bend. In the case of the known catheter apparatus referred to above, a test fluid delivery tube which is surrounded by the inflatable bladder and which carries smoke from the smoke machine to the system under test is undesirably rigid. Consequently, this known catheter apparatus will not be capable of bending as would be required for the apparatus to be able to conform to the shape of and create a reliable seal against curved and bent duct sections. Moreover, and as a result of the rigid, inflexible nature of the fluid delivery tube thereof, the aforementioned catheter apparatus is incapable of lateral movement as would also be required to produce a reliable seal against a curved or bent duct surface to which it is intended to be coupled. Accordingly, this type of catheter apparatus is limited in its usefulness and application in performing leak tests in many systems that are found in the automotive and other industries.

SUMMARY OF THE INVENTION

In general terms, a flexible universal bladder tool is disclosed to be connected to a smoke generator and coupled to a closed fluid system such as, for example, that found in the automotive industry. Smoke is delivered by way of the flexible bladder tool 1 so the closed fluid system may be tested for leaks. As it is described herein, "smoke" refers to any visible aerosol mist, spray, gas, vapor or combination thereof. Once it has been filled and pressurized, a technician can visually inspect the system by watching for any smoke that escapes therefrom to provide an indication of the presence and location of a leak.

The flexible universal bladder tool of this invention includes an inflatable bladder that is attached between proximal and distal end caps. An end cap ring extends around each of the ends of the inflatable bladder to hold the bladder in place against the end caps. The inflatable bladder has an expandable fluid reservoir that is manufactured from a resilient material so as to be able to change its shape from a relaxed, tube-like configuration when the bladder is deflated to an expanded configuration when the fluid reservoir of the bladder is filled with a fluid (e.g., air).

As an important feature of the flexible universal bladder tool herein disclosed, a flexible smoke delivery tube extends between the proximal and distal end caps. The flexible smoke delivery tube is detachably connected at its opposite ends to respective end cap fittings that are connected to the proximal and distal end caps, such that the flexible smoke delivery tube is surrounded by and coaxially aligned with the inflatable bladder when the bladder is in its relaxed, tube-like configuration. By virtue of the flexible nature of the smoke, delivery tube, the flexible bladder tool is adapted to be received by and bent around any of a variety of curved air ducts which lead to the system being tested for leaks. Moreover, the flexible smoke delivery tube is quickly and easily detachable from the first and second end cap fittings to be replaced by a different smoke delivery tube having a different length depending upon the size of the air duct and the corresponding size of the flexible universal bladder tool to be received therewithin.

The expandable fluid reservoir of the inflatable bladder lies in fluid communication with a source of fluid (e.g., air), such as a bladder inflating hand pump, via a bladder inflation inlet line and a fluid intake hole formed through the proximal end cap. Air is supplied from the source via the bladder inflation inlet line to fill the fluid reservoir and thereby cause the inflatable bladder to conform to the shape of and expand into sealing engagement with the air duct leading to the system under test. With the flexible bladder tool received in sealing engagement with the air duct, the system to be tested for leaks is placed into fluid communication with the smoke generator (e.g., a smoke machine) via a smoke inlet line and the flexible smoke delivery tube that extends between the end cap fittings of the proximal and distal end caps of the flexible bladder tool. The smoke is then delivered under pressure from the smoke delivery tube of the tool to the air duct by way of a smoke test hole that is formed through the distal end cap of the tool so that the system to which the air duct leads may be pressurized and tested for leaks.

DESCRIPTION OF THE PREFERRED EMBODIMENT

Referring initially to FIGS. 2-5 of the drawings, there is shown a flexible universal bladder tool 1 having particular application to be used to detect leaks in a closed fluid system such as that found in the automotive industry. By way of example only, the flexible bladder tool 1 is adapted to be removably received by a relatively short, straight neck 2 and then bend around and conform to the shape of a curved fluid (i.e., air) intake 3 that is common to the air intake system of some engines of a motor vehicle. By way of additional example, the closed fluid system to be tested for leaks can be a fuel system, exhaust system or air brake system of the motor vehicle which has an inlet tube 5 that communicates with the neck 2 and fluid intake 3 (best shown in FIGS. 4 and 5).

As will be explained in greater detail hereinafter the flexible bladder tool 1 is advantageously capable of being coupled to the straight neck 2, curved fluid intake 3, and inlet tube 5 regardless of the length, diameter and curvature thereof. As will also be explained in greater detail, a supply of visible gas or vapor, commonly referred to in the automotive trade as "smoke" is delivered under pressure by way of the flexible bladder tool 1 to the system undergoing testing. A technician will then be able to make a visual observation as to the presence of a leak depending upon the location of any smoke which escapes from the leak site.

As it is used herein, the term "smoke" may be a non-toxic aerosol mist produced by evaporation and condensation at controlled temperatures rather than actual smoke which is a product of partial combustion and tends to contain toxic combustion byproducts. Hence, in the preferred embodiment to be described below, "smoke" refers to either a (e.g., petroleum-based) solution that is heated and vaporized or to a visible aerosol mist, spray, gas, vapor or combination thereof that is heated or not. What is more, the flexible universal bladder tool 1 of this invention can also be used to test for leaks in other closed systems (e.g., a plumbing system or turbo-charged system). In any case, "smoke" is delivered by the flexible bladder tool 1 to the system being tested so that the system can be visually inspected for the escape of smoke to indicate the presence and location of a leak.

To test a fluid system for leaks, the flexible bladder tool 1 of the invention includes an inflatable bladder 7 that is manufactured from any suitable flexible and resilient material (e.g., molded or extruded rubber) that is capable of resisting the effects of oil, fuel and other corrosive substances and conforming to the shape of and embracing the straight neck 2 and the curved fluid intake 3 as well as the inlet tube 5 of the system being tested for leaks. To this end, the inflatable bladder 7 is adapted to undergo a change of shape from a relaxed configuration when the bladder tool 1 is at rest to an expanded (i.e., inflated configuration when the bladder tool 1 is coupled to the inlet tube 5 during a leak test at which time smoke is delivered to the system being tested for leaks.

The inflatable bladder 7 is connected at opposite, ends thereof to proximal and distal end caps 9 and 10. A pair of end rings 12 and 14 are located in peripheral recesses 15 that formed in and around each of the proximal and distal end caps 9 and 10 so as to surround the opposite ends of the inflatable bladder 7. As an alternative, the end cap rings 12 and 14 may be replaced by clamps or a heat responsive shrink seal material. The end cap rings 12 and 14 generate a force or pressure by which to hold the opposite ends of bladder 7 against respective ones of the end caps 9 and 10. The opposite ends of the inflatable bladder 7 are also attached to the end caps 9 and 10 by means of bladder securing surfaces 16 and 18 that are formed in and extend outwardly from the end caps 9 and 10. By way of example, the bladder securing surfaces 16 and 18 can be barbs, screws, threads, ridges, or the like. In addition, optional pins or screws (designated 19 in FIG. 1) can be used to more reliably attach the end cap rings 12 and 14 to end caps 9 and 10. To facilitate the attachment of the end cap rings 12 and 14 around the end caps 9 and 10, a chamfer 20 is formed in the outside end of each of the end cap rings 12 and 14 so as to lie adjacent and edge of each of the recesses 15 in which the rings are located.

Figure 2:
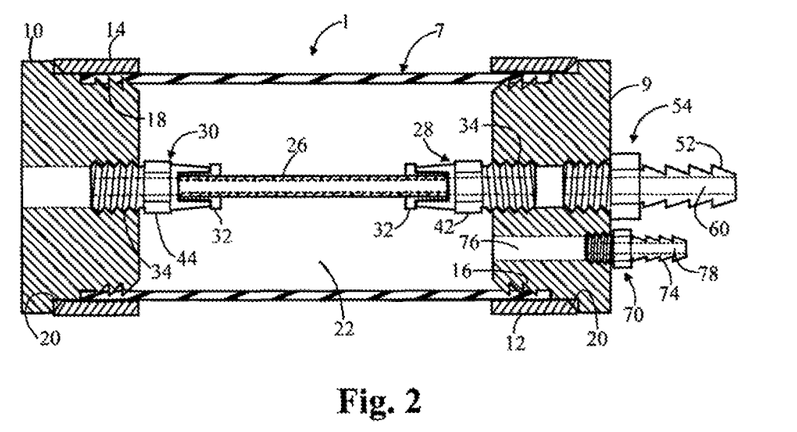
FIG. 2 is a cross-section of the flexible universal bladder tool taken along lines 2-2 of FIG. 1 showing an inflatable bladder of the tool in a deflated tubular configuration.

As is best shown in FIG. 2, when the inflatable bladder 7 is in it is aforementioned relaxed configuration, the bladder has a tube-like shape between the proximal and distal end caps 9 and 10. Located at the interior of the tube-like bladder 7 is an expandable reservoir 22. As is best shown in FIG. 5, when the inflatable bladder 7 is inflated to the aforementioned expanded configuration, its tube-like shape is distorted and pushed outwardly towards the straight neck 2 and the curved fluid intake 3 within which the flexible bladder tool is located during a leak test. As will be explained when referring to FIGS. 4-6, the expandable reservoir 22 is filled with a fluid (e.g., air or inert gas) to correspondingly cause the bladder 7 to be inflated to its expanded configuration.

Figure 4:
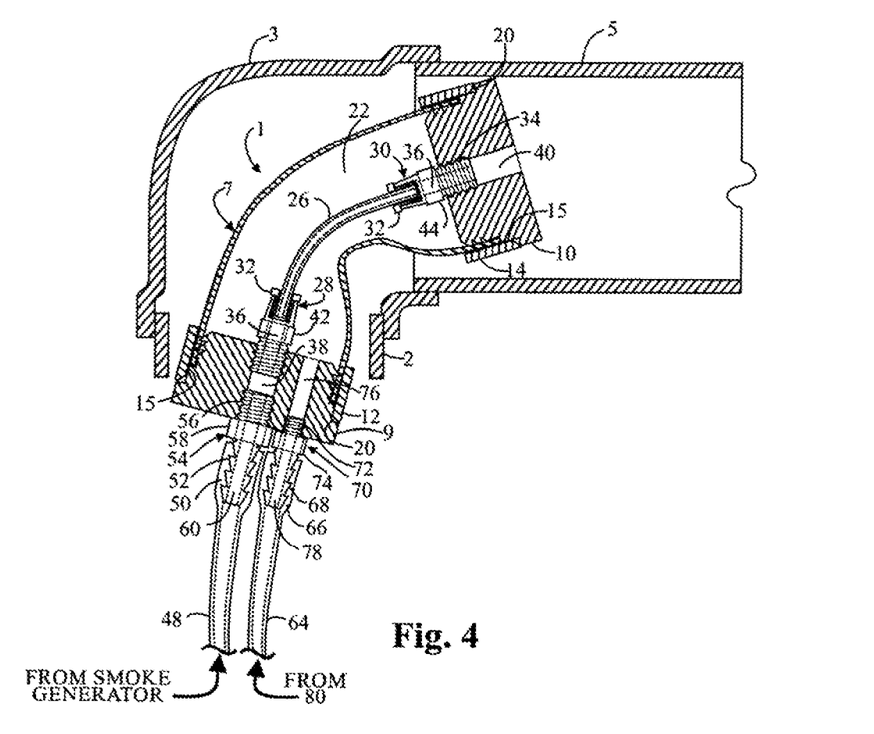
FIG. 4 shows the flexible universal bladder tool coupled to and bending around a curved air duct of a system to be tested for leaks when the inflatable bladder of the tool is at rest and deflated.
Figure 5:
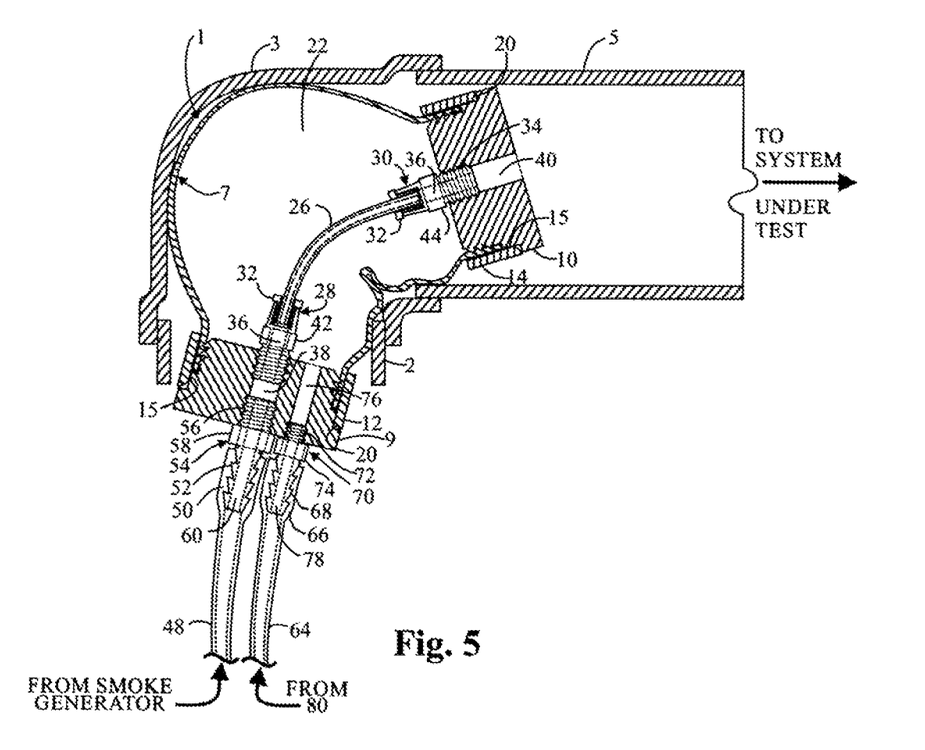
FIG. 5 shows the flexible universal bladder tool sealed against the curved air duct of the system wider test after the inflatable bladder of the tool has been inflated to an expanded configuration at which to conform to the shape of the curved duct.

An important detail of this invention is now disclosed by which the flexible universal bladder tube 1 is uniquely adapted to be bent in the manner shown in FIG. 4 so as to be capable of conforming to the shape or and engaging the straight neck 2 and the fluid intake 3. More particularly, a flexible smoke delivery tube 26 is detachably connected between the proximal and distal end caps 9 and 10 of the bladder tool 1 so as to be coaxially aligned with respect to inflatable bladder 7 when the bladder has a tube-like shape in its relaxed configuration of FIG. 2.

The smoke delivery tube 26 which extends between the end caps 9 and 10 is, for example, a high pressure tube that is manufactured from flexible nylon, plastic, or the like. One commercially available smoke delivery tube 26 that is, suitable for use herein is Part No. IB-151-05 manufactured by Controlled Motion, Inc. The flexible smoke delivery tube 26 is positioned inside the expandable reservoir 22 of the inflatable bladder 7 to be detachably connected between the proximal and distal end caps 9 and 10 of the flexible bladder tool 1 by means of first and second end cap fittings 28 and 30. It may be appreciated that the length of the bladder tool 1 may be selectively adjusted for the purpose of leak testing a variety of different fluid systems with fluid ducts having correspondingly different dimensions by substituting one smoke delivery tube 26 and flexible bladder 7 having first lengths for a different smoke delivery tube and flexible bladder having different lengths. If a much different diameter size is desired, then the diameters of end caps 9 and 10, end cap rings 12 and 14 and inflatable bladder 7 would all be sized accordingly.

Each of the first and second end cap fittings 28 and 30 includes a lock ring 32 at one end and a threaded cylindrical insert 34 at the opposite end. A respective smoke test channel 36 and 37 runs through each end cap fitting 28 and 30 between the lock ring 32 and the insert 34 thereof. A first threaded cylindrical smoke test hole 38 is formed axially through the proximal end cap 9, and a second threaded cylindrical smoke test hole 40 is formed axially through the distal end cap 10. A rotational force is applied to a force transmitting base 42 which surrounds the interface of the opposing lock ring and insert ends 32 and 34 of the first end cap fitting 28 by which the threaded cylindrical insert 34 of fitting 28 is rotated into a fluid-tight sealing engagement with the threaded smoke test hole 38 through the proximal end cap 9. A rotational forced is also applied to a force transmitting base 44 which surrounds the interface of the opposing lock ring and insert ends 32 and 34 of the second end cap fitting 30 by which the threaded cylindrical insert 34 of fitting 30 is rotated into a fluid-tight sealing engagement with the threaded smoke test hole 40 through the distal end cap 10.

Figure 3:
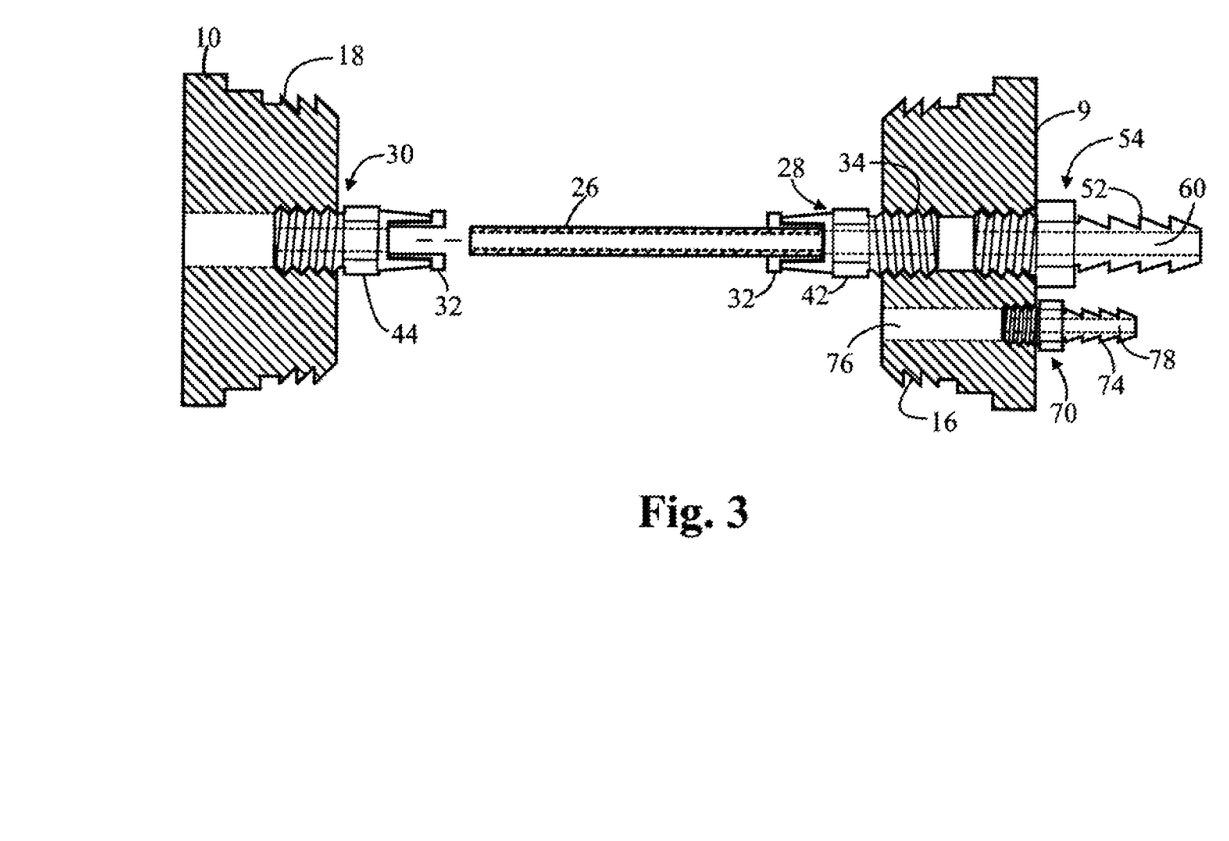
FIG. 3 is a cross-section of the flexible universal bladder tool showing a flexible smoke delivery tube that is surrounded by the inflatable bladder and detachably connected to opposing end caps of the tool.

The lock rings 32 of the first and second end cap fittings 28 and 30 at which opposite ends of the flexible smoke delivery tube 26 are engaged are preferably identical and commercially available from McMaster CARR as Part No, 7880T123. In this example, the opposite ends of the flexible smoke delivery tube 26 are surrounded and frictionally engaged by the lock rings 32. Thus, by first pulling back on the lock rings 32, the smoke delivery tube 26 is simply and easily pushed into receipt by the lock rings 32 of the first and second end cap fittings 28 and 30 so that delivery tube 26 runs longitudinally through the interior of the inflatable bladder 7 of the flexible bladder tool 1. Likewise, and as is best represented at FIG. 3, by first pulling back on the lock rings 32, the smoke delivery tube 26 can be quickly pulled outwardly therefrom and removed from the end cap fittings 28 and 30.

A smoke inlet line 48 having a fluid connector 50 at one end is mated to a complementary fluid connector 52 of a third end cap fitting 54. The third end cap fining 54 has a threaded cylindrical insert 56 located opposite the fluid connector 52 thereof. A rotational force is applied to a force transmitting base 58 which surrounds the interface of the opposing connector and insert ends 52 and 56 of the third end cap fitting 54 to cause the threaded cylindrical insert 56 of fitting 54 to be rotated into a fluid-tight sealing engagement with the threaded smoke intake bole 38 formed through the proximal end cap 9 of the bladder tool 1. The threaded cylindrical insert 34 of the first end cap fitting 28 and the threaded cylindrical insert 56 of the third end cap fitting 54 lie at opposite ends of the threaded smoke test hole 38 formed through the proximal end cap 9.

A smoke test channel 60 runs through the third end cap fitting 54 between the fluid connector 52 and the threaded cylindrical insert 56 thereof so that the smoke test channel 36 of the first end cap fitting 28 and the smoke test channel 60 of the opposing third end cap fitting 54 lie in spaced axial alignment. Thus, a continuous smoke inlet path is created between the smoke inlet line 48 and the flexible smoke delivery tube 26 by way of the axially aligned smoke test channels 36 and 60 which run through the first and third end cap fittings 28 and 54 that are coupled to opposite ends of the proximal end cap 9.

A bladder inflation inlet line 64 having a fluid connector 66 at one end is mated to a complementary fluid connector 68 of a fourth end cap fitting 70. The fourth end cap fitting 70 has a threaded cylindrical insert 72 located opposite the fluid connector 68 thereof. A rotational force is applied to a force transmitting base 74 which surrounds the interface of the opposing connector and insert ends 68 and 72 of the fourth end cap fitting 70 to cause the threaded cylindrical insert 72 of fitting 70 to rotate into a fluid-tight sealing engagement with a threaded fluid intake hole 76 that is formed through the proximal end cap 9. The threaded smoke test hole 38 and the threaded fluid intake hole 76 are formed in spaced parallel alignment with one another through the proximal end cap 9 of the flexible universal bladder tool 1.

A fluid channel 78 runs through the fourth end cap fitting 70 between the fluid connector 68 and the threaded cylindrical insert 72 thereof. Thus, a continuous fluid inlet path is created between the bladder inflation inlet tube 64 and the interior of the expandable reservoir 22 of the inflatable bladder 7 of the bladder tool 1 by way of the fluid intake hole 76 through the proximal end cap 9 and the fluid channel 78 through the fourth end cap fitting 70.

Figure 1:
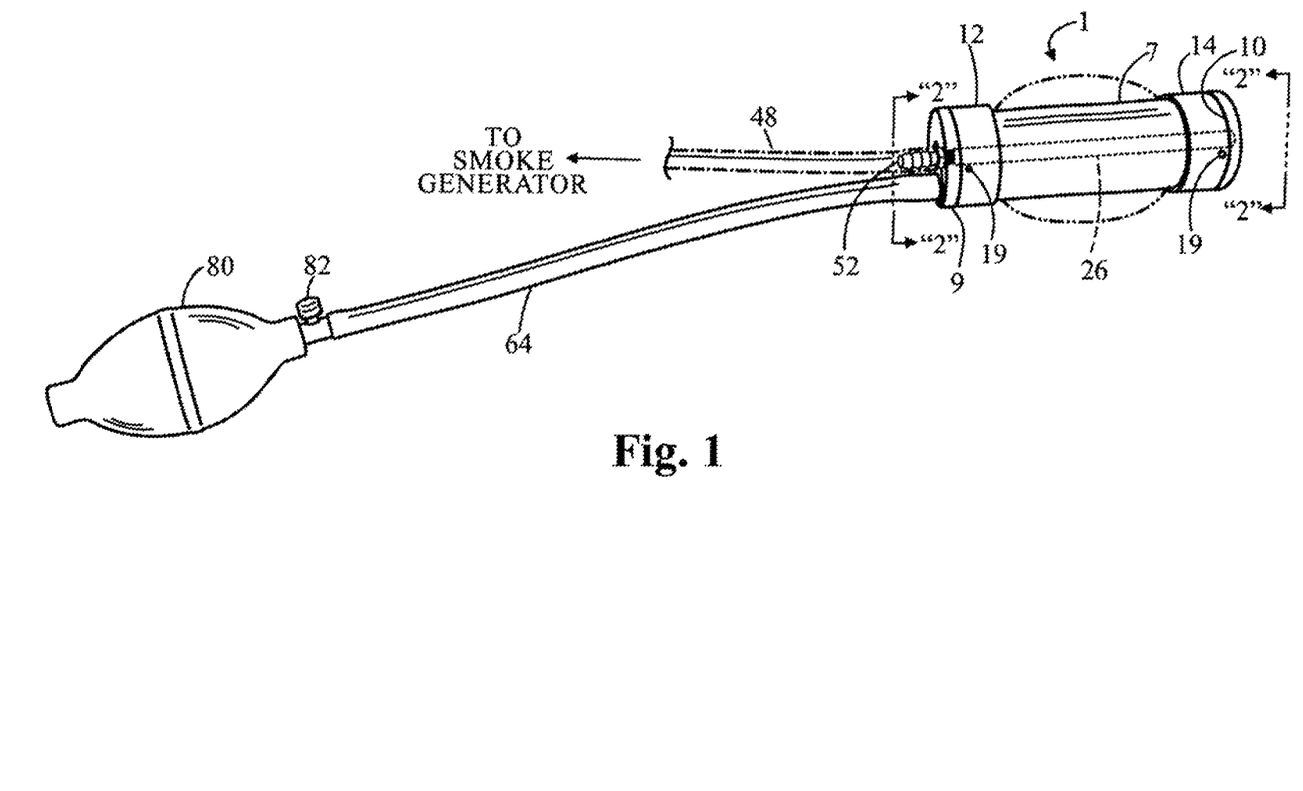
FIG. 1 is a perspective view of a flexible universal bladder tool coupled to a source of air according to a preferred embodiment of this invention by use in detecting a leak in a closed fluid system.

The operation of the flexible universal bladder tool 1 of this invention for testing a closed fluid system for leaks is now described while referring concurrently to FIGS. 1-5 of the drawings. As is best shown in FIG. 1, a bladder inflator 80 is coupled to the bladder inflation inlet line 64. The bladder inflator 80 can be, for example, a conventional hand operated pump. The bladder inflator 80 is operated (i.e., manually compressed) to cause a supply of fluid (e.g., air) to flow under pressure into the expandable reservoir 22 of the inflatable bladder 7 by way of the aforementioned continuous fluid inlet path which includes the bladder inflation line 64, the fluid channel 78 through the fourth end cap fitting 70, and the fluid intake hole 76 formed in the proximal end cap 9 of tool 1.

That is, the flexible universal bladder tool 1 is first located in fluid communication with the system to be tested for leaks at the inlet tube 5 (best shown in FIGS. 4 and 5). By virtue of the flexible nature of both the bladder 7 and the smoke delivery tube 26 that is surrounded thereby, and unlike other bladder tools known in the art having a rigid inflexible smoke delivery tube, the bladder tool 1 of this invention is advantageously capable of bending around and being coupled to any of a variety of fluid ducts, such as the short straight neck 2 and the sharply curved fluid intake 3, which lead to the curved inlet tube 5 of the system to be leak tested.

In this same regard, once the bladder inflator 80 is operated, and fluid (e.g., air) is supplied (i.e., pumped) to the tool 1, the inflatable bladder 7 thereof will begin to expand and inflate. As is best shown in FIG. 5, the initial tube-like shape of the bladder 7 shown in FIG. 2 is now expanded and distorted, so as to conform to the shape of and embrace the straight and curved surfaces (i.e., neck 2, intake 3, and inlet tube 5) leading to the system to be tested for leaks. Fluid is supplied to the tool 1 until the inflatable bladder 7 is sufficiently inflated in order to form a fluid-tight seal against the majority of inlet duct surfaces leading to the system under test regardless of the curvature, diameter and length thereof. At the conclusion of the leak test, when it is desirable to deflate the bladder 7 and remove the bladder tool 1 from the inlet tube 5, a pressure release valve 82 (shown in FIG. 1) that communicates with the bladder inflation inlet line 64 is opened to permit the fluid with which the bladder 7 has been inflated to escape from the tool 1.

Once the flexible universal bladder tool 1 of this invention has been coupled to the closed fluid system to be tested for leaks in the manner described above, a supply of smoke is delivered to the system by way of the tool. More particularly, the smoke inlet line 48 which is connected to the proximal end cap 9 of tool 1 is coupled to a source of smoke. By way of example, smoke generators (not shown) are known which are capable of supplying smoke under pressure to the system under test via the smoke inlet line 48, the axially aligned smoke test channels 36 and 60 through the first and third end cap fittings 28 and 54 that are connected to the proximal end cap 9, the flexible smoke delivery tube 26, and the smoke test channel 37 through the second end cap fitting 30 that is connected to the distal end cap 10.

Reference may be made in this regard to U.S. Pat. Nos. 6,142,009; 6,526,808 and 6,477,890 for examples of smoke generators that are suitable for creating the smoke required to pressurize and fill the system to be tested for leaks. By virtue of the foregoing, the system can be tested for leaks by visually inspecting the system for any smoke escaping therefrom in order to provide an indication of the presence and location of the leak.

Figure 6:
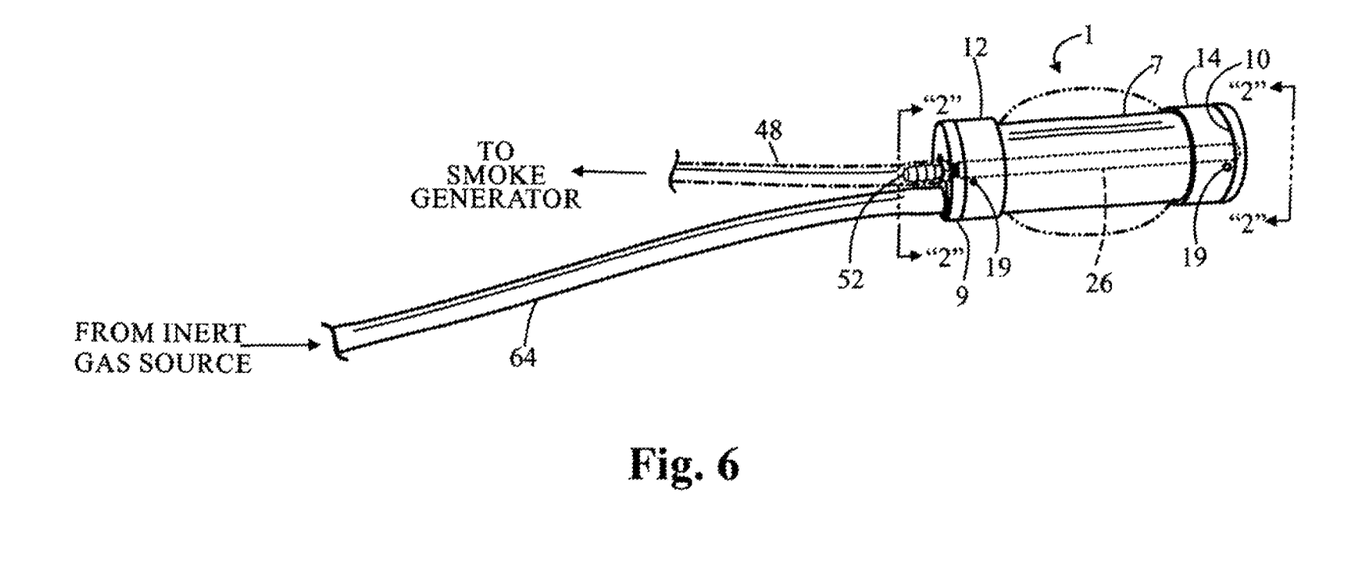
FIG. 6 shows the flexible universal bladder tool of FIG. 1 coupled to a source of inert gas from which the inflatable bladder of the tool is inflated.

The flexible universal bladder tool 1 shown in FIGS. 1-5 has been described herein as having particular application in the automotive industry. However, the tool 1 can also be used for leak testing a fuel tank of an aircraft. The expanded bladder 7 will seal the fuel tank inlet, or inlet adapter, and as is best shown in FIG. 6 of the drawings, an inert gas (e.g. nitrogen, CO2, or helium) from a source thereof can be introduced into the fuel tank through the flexible bladder delivery tube 26. An inert gas is used in the example of FIG. 6 instead of air, because it is clean and, most importantly, it does not contain combustion-sustaining oxygen (air contains approximately 21% oxygen). That is, should the fuel tank be tested in a volatile hydrocarbon filled environment, a spark in the presence of combustible air could cause an explosion. Since the entire test will be performed using an inert gas (i.e. to prevent adding oxygen into the fuel tank), the bladder 7 is also inflated with an inert gas from the source thereof instead of using air from the bladder inflator 80 shown in FIG. 1.

If air were otherwise used to inflate the bladder, oxygen from inside the bladder would be introduced into the fuel tank should the bladder burst during the test. For the same safety considerations, an inert gas can also be used with the flexible bladder tool 1 for testing a large fuel pipeline (e.g., in fuel refinery equipment) wherein the tool will have an appropriate diameter as required to fit the pipe. In this example, the hand-operated bladder inflator (designated 80 in FIG. 1) can be replaced by an electric or pneumatic pump that delivers the appropriate volume to quickly fill a large sized bladder.

The invention claimed is:

1. A flexible universal bladder tool having first and opposite ends to be coupled to a fluid system to test the system for leaks, wherein said system has at least one fluid duct, said flexible bladder tool comprising:

an inflatable bladder manufactured from a resilient material to be filled with fluid from a source thereof, said inflatable bladder having a deflated configuration when said bladder is devoid of fluid, and said bladder having an expanded configuration when said bladder is filled with the fluid from said source so that said bladder conforms to the shape of and moves into fluid-tight sealing engagement with the fluid duct of the system to be tested for leaks; and a flexible smoke delivery tube having first and opposite ends and being surrounded by said inflatable bladder so as to deliver a supply of smoke from a source thereof to the system to be tested for leaks, said flexible smoke delivery tube manufactured from a flexible material so that said inflatable bladder and said smoke delivery tube surrounded by said bladder are adapted to be bent around a curve that is formed in the fluid duct of the system under test;

a proximal end cap located at the first end of said universal bladder tool and having a first channel extending therethrough and a distal end cap located at the opposite end of said universal bladder tool and having a second channel extending therethrough, said inflatable bladder having first and opposite ends and a tubular shape in the deflated configuration thereof, each of the first end of said tubular-shaped bladder and the first end of said flexible smoke delivery tube being connected to said proximal end cap, and each of the opposite end of said tubular-shaped bladder and the opposite end of said flexible smoke delivery tube being connected to said distal end cap;

a first fitting connected to said proximal end cap at the first channel thereof, and a second fitting connected to said distal end cap at the second channel thereof, the first and opposite ends of said flexible smoke delivery tube being detachably connected to respective ones of said first and second fittings;

a first smoke test channel running through said first fitting connected to said proximal end cap, said first smoke test channel having a first end positioned so as to lie in fluid communication with the source of smoke and an opposite end lying in fluid communication with the first end of said flexible smoke delivery tube;

a second smoke test channel running through said second fitting connected to said distal end cap, said second smoke test channel having a first end positioned so as to lie in fluid communication with the system to be tested for leaks by way of the fluid duct thereof and an opposite end lying in fluid communication with the opposite end of said flexible smoke delivery tube; and a third fitting having first and opposite ends, said third fitting having a fluid connector at the first end thereof to be coupled to the source of smoke and an insert at the opposite end to be mated to the first channel extending through said proximal end cap, said third fitting also having a smoke test channel running therethrough and lying in fluid communication with the first smoke test channel running through said first fitting.

2. The flexible universal bladder tool recited in claim 1, wherein said inflatable bladder defines an internal fluid reservoir located between the first and opposite ends thereof, said flexible smoke delivery tube extending between said proximal and distal end caps and through the internal fluid reservoir of said inflatable bladder.

3. The flexible universal bladder tool recited in claim 2, wherein said flexible smoke delivery tube is coaxially aligned with the internal fluid reservoir of said inflatable bladder when said bladder has said tubular shape in the deflated configuration thereof.

4. The flexible universal bladder tool recited in claim 2, wherein each of said first and second fittings has a lock ring by which to surround and frictionally engage respective ones of the first and opposite ends of said flexible smoke delivery tube, the first and opposite ends of said flexible smoke delivery tube being moved out of their frictional engagement with the lock rings and detached from said first and second fittings in response to a pulling force applied to said flexible smoke delivery tube.

5. The flexible universal bladder tool recited in claim 4, wherein each of said first and second fittings has a first end at which said lock ring is located and an opposite end at which a threaded insert is located, and each of the first and second channels that extend through said proximal and distal end caps has a threaded portion, the threaded inserts of said first and second fittings being mated to respective ones of the threaded portions of said first and second channels, whereby said first and second fittings are connected to said proximal and distal end caps.

6. The flexible universal bladder tool recited in claim 2, further comprising a fourth fitting having first and opposite ends, said fourth fitting having a fluid connector at the first end thereof to be coupled to the source of fluid and a threaded insert at the opposite end, said proximal end cap having an additional channel extending therethrough, said additional channel having a threaded portion, and the threaded insert of said fourth fitting being mated to the threaded portion of said additional channel extending through said proximal end cap, said fourth fitting also having a fluid channel running therethrough so as to lie in fluid communication between the source of fluid and the internal fluid reservoir of said inflatable bladder.

7. The flexible universal bladder tool recited in claim 1, further comprising first and second recesses extending around respective ones of said proximal and distal end caps, and first and second end cap rings located within said first and second recesses to hold the first and opposite ends of said inflatable bladder against said proximal and distal end caps, each of said first and second end cap rings having a chamfered end.

8. The flexible universal bladder tool recited in claim 7, further comprising a locking pin extending through each of said first and second end cap rings by which to retain said first and second end cap rings in surrounding engagement against the first and opposite ends of said inflatable bladder.

9. A flexible universal bladder tool having first and opposite ends to be coupled to a fluid system to test the system for leaks, wherein said system has at least one fluid duct, said flexible bladder tool comprising:

an inflatable bladder manufactured from a resilient material to be filled with fluid from a source thereof, said inflatable bladder having a deflated configuration when said bladder is devoid of fluid, and said bladder having an expanded configuration when said bladder is filled with the fluid from said source so that said bladder conforms to the shape of and moves into fluid-tight sealing engagement with the fluid duct of the system to be tested for leaks; and a flexible smoke delivery tube having first and opposite ends and being surrounded by said inflatable bladder so as to deliver a supply of smoke from a source thereof to the system to be tested for leaks, said flexible smoke delivery tube manufactured from a flexible material so that said inflatable bladder and said smoke delivery tube surrounded by said bladder are adapted to be bent around a curve that is formed in the fluid duct of the system under test;

a proximal end cap located at the first end of said universal bladder tool and having a first channel extending therethrough and a distal end cap located at the opposite end of said universal bladder tool and having a second channel extending therethrough, said inflatable bladder having first and opposite ends and a tubular shape in the deflated configuration thereof, each of the first end of said tubular-shaped bladder and the first end of said flexible smoke delivery tube being connected to said proximal end cap, and each of the opposite end of said tubular-shaped bladder and the opposite end of said flexible smoke delivery tube being connected to said distal end cap; and a first fitting connected to said proximal end cap at the first channel thereof, and a second fitting connected to said distal end cap at the second channel thereof, the first and opposite ends of said flexible smoke delivery tube being detachably connected to respective ones of said first and second fittings, wherein each of said first and second fittings has a lock ring by which to surround and frictionally engage respective ones of the first and opposite ends of said flexible smoke delivery tube, the first and opposite ends of said flexible smoke delivery tube being moved out of their frictional engagement with the lock rings and detached from said first and second fittings and the proximal and distal end caps to which said first and second fittings are connected in response to a pulling force applied to said flexible smoke delivery tube.

10. The flexible universal bladder tool recited in claim 9, wherein each of said first and second fittings has a first end at which said lock ring is located and an opposite end at which a threaded insert is located, and each of said proximal and distal end caps has a threaded channel extending therethrough, the threaded insert of said first and second fittings being mated to respective ones of said threaded channels, whereby said first and second fittings are connected to said proximal and distal end caps.

* * * * *